Patented July 27, 1926.

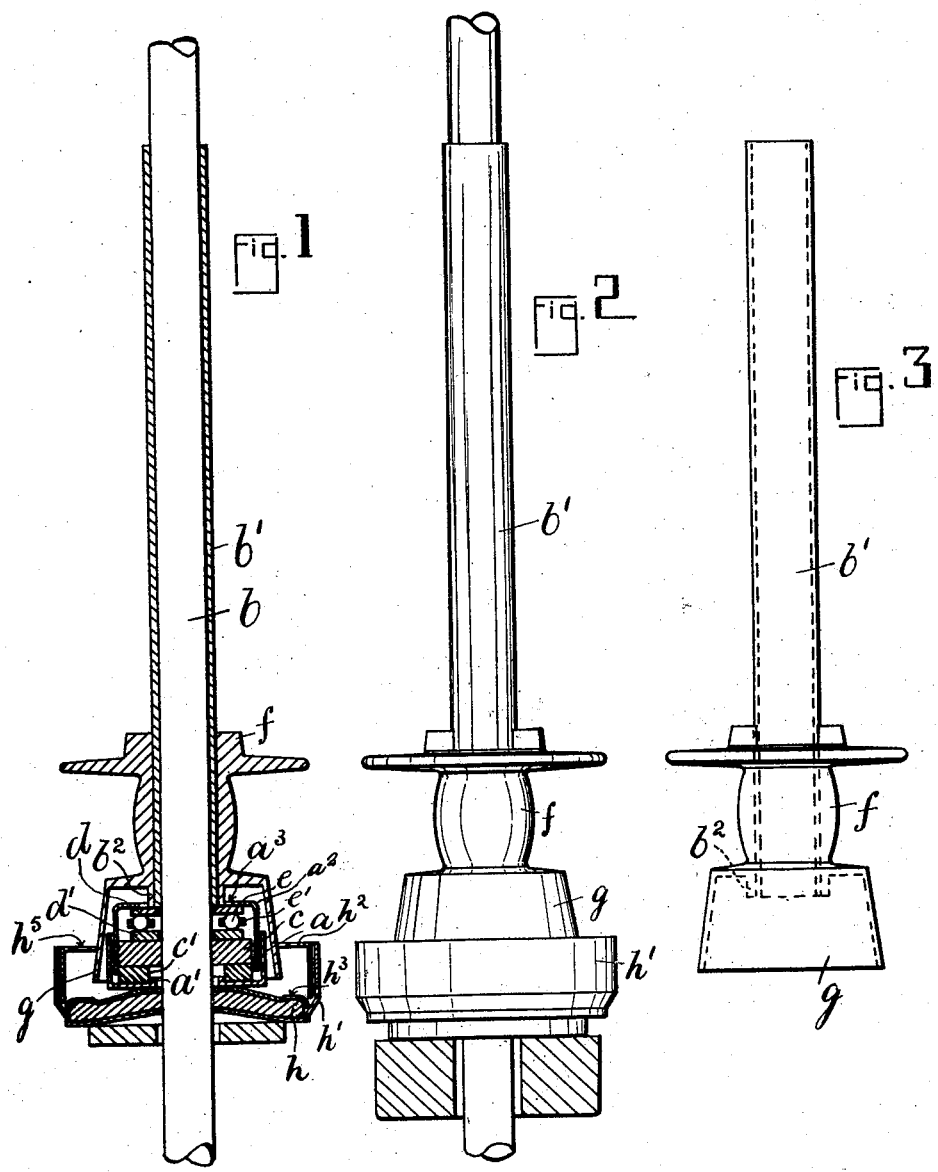

1,594,028

UNITED STATES PATENT OFFICE.

JAMES WHITEHEAD, OF OTLEY, ENGLAND.

SPINDLE APPARATUS FOR SPINNING.

Application filed January 28, 1925, Serial No. 5,226, and in Great Britain January 29, 1924.

This invention relates to spindle apparatus for use in connection with spinning frames of the cap or similar types and the object is to provide a true even running tube or wharle which rotates under better conditions of lubrication than obtained at present, which necessitates comparatively little attention, and in which the accumulation of fluff or extraneous fibrous material or dirt, whilst being greatly reduced in magnitude owing to the novel shape of wharle I use, is also confined to parts where it may not impair the effectiveness of the lubrication.

This apparatus enables an even yarn to be produced and the troubles of ineffective lubrication are avoided.

It is by virtue of the combination of the parts I use and by virtue of special forms or shapes of certain of these parts that I attain the hereinbefore stated object.

These said parts comprise a thrust bearing and an absorbent washer or washers all contained within a receptacle for lubricant, a novel form of wharle with lubricant reserving or shielding characteristics and a further absorbent washer (or washers) contained in a receptacle (or resting on the lifter rail) with a shield or casing to encircle the base or lower part of the said wharle. In order that my invention may be readily understood, I have hereunto appended a sheet of drawings to illustrate same and in which:—

Fig. 1 is a sectional elevation of my improved apparatus.

Fig. 2 is an elevation thereof.

Fig. 3 is an elevation of the tube or wharle I use.

Mounted within a receptacle $a$ through which the spindle $b$ passes are two absorbent washers $c$ and $c^1$ of felt or like material, the bore of the washer $c$ bearing on the spindle. The receptacle $a$ has a central opening to allow the spindle perfect freedom of rotation and this opening is bounded by a raised flange $a^1$ so that a certain depth of liquid lubricant may be retained by it within this receptacle and thus ensure that the washers $c$, $c^1$ are charged with oil. Mounted upon the upper washer $c$ is a thrust bearing which preferably comprises hard metal washers $d$, $d^1$ with highly polished surfaces forming the race between which balls $e$ is the spacing member or ring $e^1$ are arranged to take. A cover $a^2$ is provided for the receptacle $a$ and this cover has an opening $a^3$ through which a bearing part on the wharle hereinafter explained may take, to bear upon the upper washer $d$ of the bearing. The casing $a$ with its cover $a^2$ are preferably of sheet metal.

The spindle wharle $f$ has its bottom flange $g$ of inverted cup or truncated cone shape and this flange extends so as to encircle the casing $a$ with its cover $a^2$, this being so arranged to prevent the access of fluff, fibre or dirt to the interior of the casing $a$ via the opening $a^3$ or otherwise. By arranging the lower flange $g$ of the wharle to be of this shape any dirt or fibre which falls upon same instead of being directed into the lower compartment or receptacle $a$, hereinafter explained and described, said dirt or fibre is thrown off tangentially from the said flange $g$ by which means the mouth at the base of the flange $g$ is practically clear of such extraneous matter. A downwardly projecting extension $b^2$ on the wharle $f$ forms the bearing surface thereof, said extension $b^2$ contacting with the washer $d$ and this extension $b^2$ also forms the inner boundary of an annular groove wherein any fluff or fibre which may have gained access to the under side of the wharle is accommodated and prevented from seriously interfering with the lubrication.

Beneath the casing $a$ is a washer or pad $h$ of felt or like absorbent material and this is retained within a receptacle $h^1$ which has a cover $h^2$ as shown. Above this pad a perforated disc $h^4$ is superposed so that said disc $h^4$ intervenes between the base of the casing $a$ and the upper part of the pad or washer $h$; thus when the pad $h$ is required to be charged with lubricant by filling same into the receptacle $h^1$ the oil may pass through the perforations $h^3$ and so to the pad $h$.

In carrying out my invention into practical effect the felt washers in the casing $a$ are provided with the desired amount of liquid or semi-liquid lubricant, the cover $a^2$ then being placed upon same and then the wharle $f$ being allowed to descend so that its bearing surface $b^2$ contacts with the washer $d$. The lubricant is also allowed to run through the hole $h^5$ into the receptacle $h^1$ through the perforations $h^3$ and thence to the washer $h$ and on this being done the spindle is in perfect working order. The felt washers and their casings are stationary and any lubricant thrown from the thrust bearing by centrifugal force is checked by the casing $a$ and its cover $a^2$ and guided back to the felt washers $c$, $c^1$. The pressure on the washer or pad $h$ due to the weight it sustains ensures an adequate contact between said washer $h$ and the spindle $b$ to render the lubrication of the latter effective and efficient so that the tube $b^1$ of the wharle in its traverse over the spindle $b$ is always prefectly lubricated.

Such being the nature and object of my said invention what I claim is:—

1. Spindle apparatus for spinning frames of the type referred to comprising in combination the following parts:—an oil casing containing a thrust bearing and a soft absorbent washer, a wharle with a lower flange in the form of a downwardly extending annular shield taking over said oil casing, a bearing part on said wharle resting upon the said thrust bearing, and an absorbent washer within a lower casing all substantially as herein described.

2. Spindle apparatus for spinning frames of the type referred to comprising in combination with the following parts:—an oil casing, a thrust ball bearing in said oil casing, a soft absorbent washer beneath said ball bearing and in said oil casing, a wharle with a lower flange in the form of a downwardly extending annular shield taking over said oil casing, a bearing part on said wharle resting upon the said thrust bearing, and a lower absorbent and resilient washer acting as a cushion beneath the said oil casing and resting on the lifter rail.

3. In spindle apparatus for spinning frames of the type referred to the employment in combination of devices as claimed in claim 1, in which the spindle wharle has a lower flange of inverted cup shape, the mouth thereof being wider than the upper end of said flange substantially as herein specified.

4. In spindle apparatus as claimed in claim 1, a wharle with an annular wall such as $b^2$ on the underside of the interior of its cup shaped flange, substantially as herein specified.

J. WHITEHEAD.